United States Patent
Guan

(10) Patent No.: US 10,832,058 B2
(45) Date of Patent: Nov. 10, 2020

(54) BEHAVIOR RECOGNITION APPARATUS, BEHAVIOR RECOGNITION METHOD, AND RECORDING MEDIUM

(71) Applicant: Ricoh Company, Ltd., Tokyo (JP)

(72) Inventor: Haike Guan, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 32 days.

(21) Appl. No.: 16/273,199

(22) Filed: Feb. 12, 2019

(65) Prior Publication Data

US 2019/0303680 A1 Oct. 3, 2019

(30) Foreign Application Priority Data

Mar. 29, 2018 (JP) ................. 2018-064693

(51) Int. Cl.
| | |
|---|---|
| *G06K 9/00* | (2006.01) |
| *G06Q 10/06* | (2012.01) |
| *G06K 9/38* | (2006.01) |
| *G06K 9/44* | (2006.01) |

(52) U.S. Cl.
CPC ..... *G06K 9/00744* (2013.01); *G06K 9/00718* (2013.01); *G06K 9/38* (2013.01); *G06K 9/44* (2013.01); *G06Q 10/063114* (2013.01)

(58) Field of Classification Search
CPC .......... G05B 2219/37587; G06F 17/18; G06Q 10/063114; G07C 3/02; G06K 9/00342; G06K 9/00718; G06K 9/00744; G06K 9/38; G06K 9/44; G06K 9/6256
See application file for complete search history.

(56) References Cited

U.S. PATENT DOCUMENTS

| | | | | |
|---|---|---|---|---|
| 2002/0075407 A1* | 6/2002 | Cohen-Solal | ...... | H04N 21/4221 348/565 |
| 2007/0282479 A1* | 12/2007 | Shibuya | ................. | G06Q 10/06 700/111 |
| 2008/0223917 A1* | 9/2008 | Miyashita | ............. | G06Q 10/06 235/376 |
| 2008/0244409 A1* | 10/2008 | Millar | ................. | G06F 3/04845 715/719 |
| 2014/0140596 A1* | 5/2014 | Kawaguchi | ........ | G06K 9/00335 382/128 |
| 2015/0169947 A1* | 6/2015 | Kawaguchi | ........ | G06K 9/00335 382/103 |
| 2015/0239127 A1* | 8/2015 | Barajas | .................. | B25J 9/1671 700/253 |
| 2016/0012361 A1* | 1/2016 | Sugiyama | ........ | G06K 19/06037 705/7.38 |

(Continued)

FOREIGN PATENT DOCUMENTS

| | | |
|---|---|---|
| JP | 2011-100175 | 5/2011 |
| JP | 2018-055591 | 4/2018 |

*Primary Examiner* — Jingge Wu
(74) *Attorney, Agent, or Firm* — Xsensus LLP

(57) ABSTRACT

A behavior recognition apparatus, a behavior recognition method, and a recording medium storing a control program for performing the behavior recognition method, each of which: receives an input of a movie obtained by capturing images of a site; recognizes one or more element behaviors constituting a standard work of a worker included in the input movie; and determines a start time and a required time for the standard work from the recognized one or more element behaviors.

12 Claims, 12 Drawing Sheets

(56) References Cited

U.S. PATENT DOCUMENTS

| | | | |
|---|---|---|---|
| 2017/0004586 A1* | 1/2017 | Suzuki | G11B 27/322 |
| 2017/0337842 A1* | 11/2017 | Tsuji | G09B 5/02 |
| 2017/0364857 A1* | 12/2017 | Suri | G06Q 10/06315 |
| 2018/0082208 A1* | 3/2018 | Cormier | G06F 11/3447 |
| 2018/0290019 A1* | 10/2018 | Rahimi | A63B 24/0021 |
| 2018/0293598 A1* | 10/2018 | Sato | G06Q 30/0201 |
| 2020/0026927 A1* | 1/2020 | Narasimha | G06K 9/00335 |

* cited by examiner

FIG. 3

| NO. | MAIN STEPS | TIME (SECONDS) | REMARKS |
|---|---|---|---|
| s1 | TEMPORARILY PLACE BOX CONTAINING TARGET PRODUCT | 02 | |
| s2 | SEARCH BOX FOR TARGET PRODUCT AND TAKE OUT TARGET PRODUCT FROM BOX | 10 | CONFIRM WHETHER PRODUCT IN BOX IS TARGET PRODUCT |
| s3 | PUT TARGET PRODUCT ON PRODUCT SHELF | 15 | CONFIRM WHETHER TARGET PRODUCT NUMBER MATCHES SHELF NUMBER |

BEHAVIOR RECOGNITION APPARATUS, BEHAVIOR RECOGNITION METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-064693, filed on Mar. 29, 2018, in the Japan Patent Office, the entire disclosure of which is hereby incorporated by reference herein.

BACKGROUND

Technical Field

The present invention relates to a behavior recognition apparatus, a behavior recognition method, and a recording medium recording computer readable program for the behavior recognition apparatus and the behavior recognition method.

Discussion of the Background Art

It is an important task to visualize the behavior of workers and improve production efficiency in offices, factories, and other workplaces. Therefore, it is effective to photograph a movie at a workplace with a camera and examine the obtained movie to recognize and examine the behavior of a worker for a specific standard work (hereinafter referred to as standard work).

Nevertheless, in order to visually analyze movies photographed at the workplace by the camera, extract behaviors for a standard work performed in a certain procedure, measure the time for each action, and then visualize these actions, a huge amount of analysis time and effort is expected. Thus, conventionally, in order to automatically recognize a human behavior, a method has been proposed in which a person is recognized from a photographed movie, a movement trajectory of the recognized person is obtained from the center of gravity of the person, and a specific behavior is recognized from the movement trajectory.

However, in the workplace, the work posture when workers perform a specific behavior is diverse and it is difficult to recognize persons having variously changed postures. In addition, errors in human recognition greatly affect the detection result of a trajectory produced by a moving person. As a result, a large error occurs in the recognition of the specific behavior based on the trajectory of the movement of the person. Therefore, it is not practicable to accurately measure the start time and the required time for a specific behavior. As described above, conventionally, when a worker performs the standard work, there is a disadvantage that it is difficult to recognize the behavior for the standard work merely by the movement of the worker in a case where the worker carries an object or manipulates an object.

SUMMARY

Example embodiments of the present invention include a behavior recognition apparatus, a behavior recognition method, and a recording medium storing a control program for performing the behavior recognition method, each of which: receives an input of a movie obtained by capturing images of a site; recognizes one or more element behaviors constituting a standard work of a worker included in the input movie; and determines a start time and a required time for the standard work from the recognized one or more element behaviors.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a diagram illustrating the contents of a standard work document stating the contents of the standard work according to the embodiment of the present invention;

Figure 1:
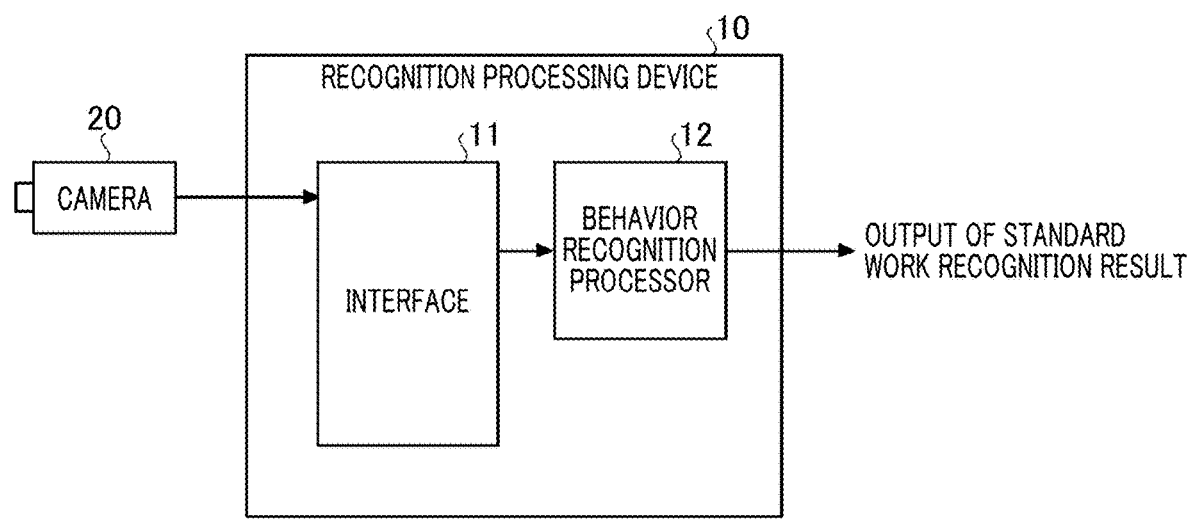
FIG. 1 is a block diagram illustrating a schematic configuration example of a behavior recognition apparatus according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of a behavior recognition apparatus, a behavior recognition method, computer readable program for the behavior recognition apparatus and the behavior recognition method, and a recording medium recording the program will be described in detail below with reference to the accompanying drawings. As described below, in the present embodiments, a workplace is photographed by a camera, an element behavior of a standard work performed by a worker at the workplace is automatically recognized from the photographed movie, a behavior for the standard work is recognized from the element behavior, and the time for the standard work is automatically measured. The behavior of workers at a workplace is diverse, while the behavior for a standard work has various postures. Therefore, in the present embodiment, by decomposing the behavior for the standard work into a plurality of element behaviors and separately recognizing the decomposed element behaviors, it becomes easier to cope with diverse posture changes of the workers at the work site and automatically measure the required time for the standard work. In the following description, "movie" includes not only "moving image (also referred to as video) data" but also "image data made up of a plurality of consecutive still images". The "image data made up of a plurality of consecutive still images" may also include image data made up of a plurality of consecutive still images, for example, obtained by executing photographing at a predetermined cycle.

FIG. 1 is a block diagram illustrating a schematic configuration example of the behavior recognition apparatus according to an embodiment of the present invention. As illustrated in FIG. 1, the behavior recognition apparatus includes a camera 20 and a recognition processing device 10.

Figure 2:
FIG. 2 is a diagram illustrating an example of a standard work of a worker photographed at a workplace.

The camera 20 is a photographing device capable of photographing a moving image, such as a video camera; the camera 20 is installed at a workplace to photograph workers working at the workplace and inputs the obtained movie to the recognition processing device 10. An example of the input movie of the workplace is illustrated in FIG. 2. FIG. 2 illustrates an example of the standard work of a worker photographed at a workplace. The contents of the standard work are stated in a standard work document. An example of the contents of the standard work illustrated in FIG. 2 will be described using a standard work document exemplified in FIG. 3. An example of a standard work of putting a product on a product shelf is indicated here. FIG. 3 is a diagram illustrating the contents of a standard work document stating the contents of the standard work according to the present embodiment. The standard work of putting a product on the product shelf has three element behaviors from s1 to s3 below. Each standard work is supposed to be completed within a predetermined time. s1: temporarily place a box containing a target product. s2: search the box for the target product and take out the target product from the box. s3: put the target product on a product shelf.

Figure 4:
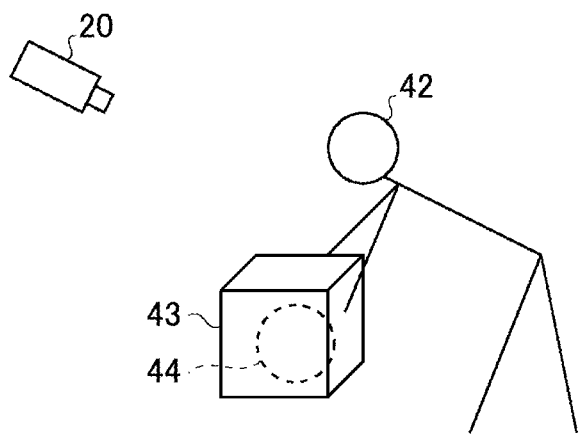
FIG. 4 is a diagram illustrating an element behavior of a standard work of temporarily placing a box containing a target product.
Figure 5:
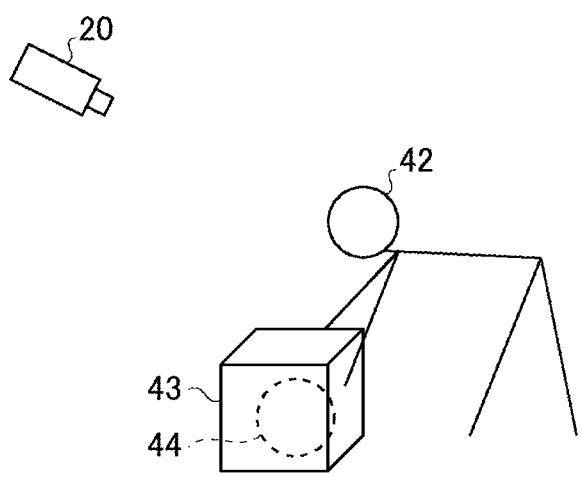
FIG. 5 is a diagram illustrating an element behavior of the standard work of searching a box containing a target product for a target product 44 and taking out the target product 44 from the box while a worker bends his/her waist.
Figure 6:
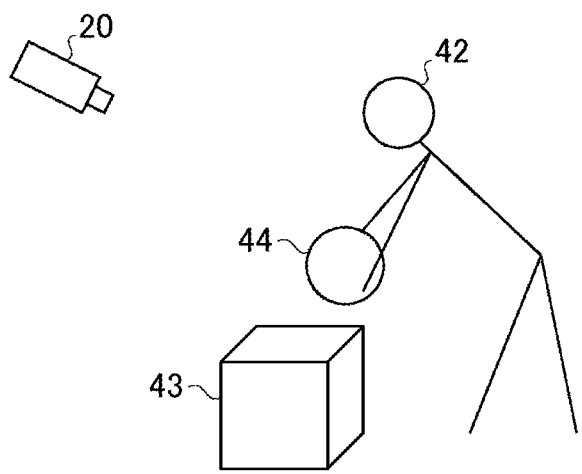
FIG. 6 is a diagram illustrating an element behavior of the standard work of putting a taken-out target product on a product shelf.

However, with a method of directly recognizing behaviors of workers having many changes in posture, it is sometimes difficult to specify the standard work at the workplace. Therefore, in the present embodiment, the standard work is decomposed into element behaviors as illustrated in FIGS. 4 to 6 and separately recognized. FIGS. 4 to 6 are diagrams illustrating an example of decomposing the standard work of putting a product on the product shelf into a plurality of element behaviors. In FIGS. 4 to 6, reference numeral 20 denotes a camera, reference numeral 42 denotes a worker, reference numeral 43 denotes a box, and reference numeral 44 denotes a target product. FIG. 4 illustrates an element behavior (s1) of the standard work of temporarily placing the box 43 containing the target product 44. FIG. 5 illustrates an element behavior (s2) of the standard work of searching the box 43 containing the target product 44 for the target product 44 and taking out the target product 44 from the box 43 while the worker 42 bends his/her waist. FIG. 6 illustrates an element behavior (s3) of the standard work of putting the taken-out target product 44 on the product shelf.

Figure 7:
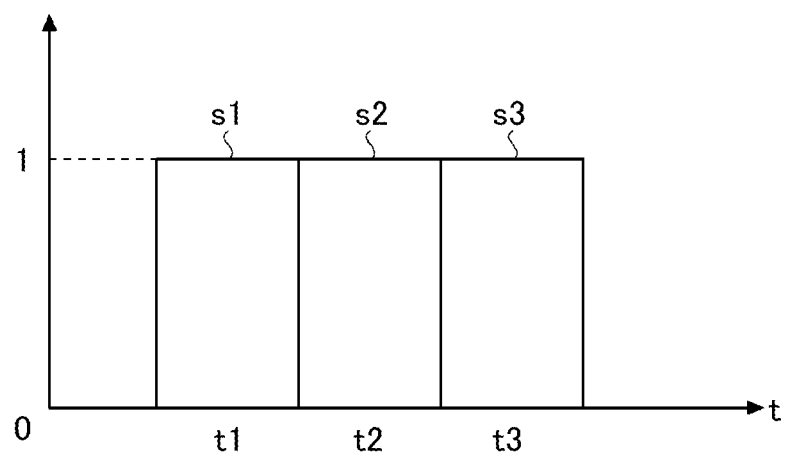
FIG. 7 is a diagram illustrating an example of the required time for the standard work and element behaviors of the standard work exemplified in FIG. 3.

FIG. 7 is a diagram illustrating an example of the required time for the standard work and the element behaviors of the standard work exemplified in FIG. 3. The time for the element behavior s1 is assumed as t1. The required time for the element behavior s2 is assumed as t2 and the required time for the element behavior s3 is assumed as t3. Accordingly, the required time for the entire standard work is given as required time t1+t2+t3 obtained by summing the required time t1, t2, and t3.

Figure 8:
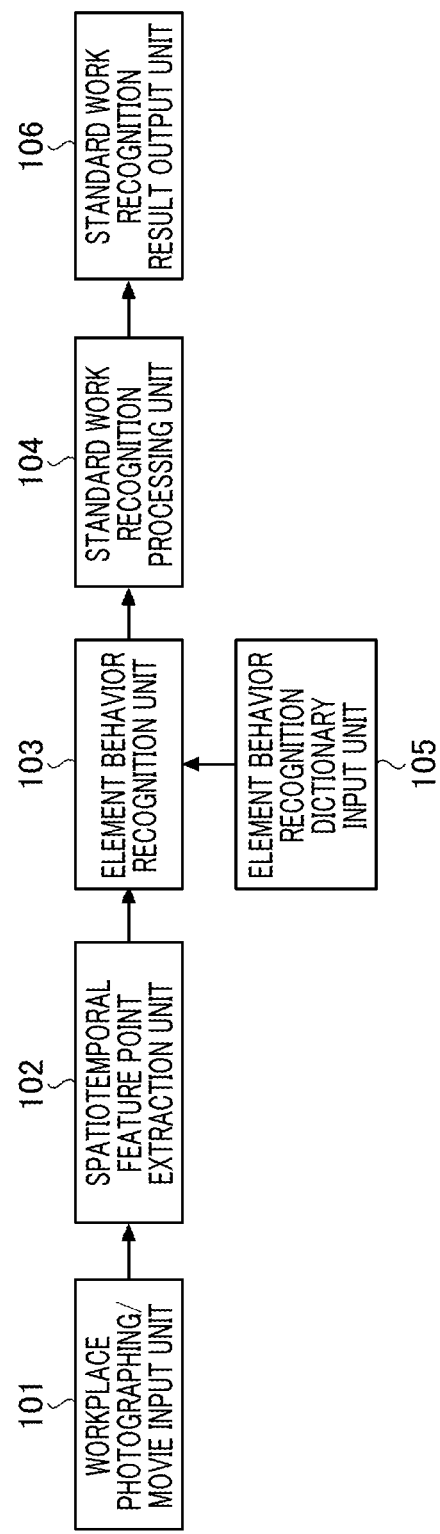
FIG. 8 is a block diagram illustrating a schematic configuration example of a behavior recognition processor according to the embodiment of the present invention.

Furthermore, the recognition processing device 10 illustrated in FIG. 1 includes an interface 11 and a behavior recognition processor 12. The interface 11 receives an input of a movie acquired by the camera 20 to output to the behavior recognition processor 12. The behavior recognition processor 12 executes a behavior recognition process according to the present embodiment. FIG. 8 is a block diagram illustrating a schematic configuration example of the behavior recognition processor 12 according to the embodiment of the present invention. As illustrated in FIG. 8, the behavior recognition processor 12 according to the present embodiment includes a workplace photographing/movie input unit 101, a spatiotemporal feature point extraction unit 102, an element behavior recognition unit 103, a standard work recognition processing unit 104, an element behavior recognition dictionary input unit 105, and a standard work recognition result output unit 106.

Figure 9:
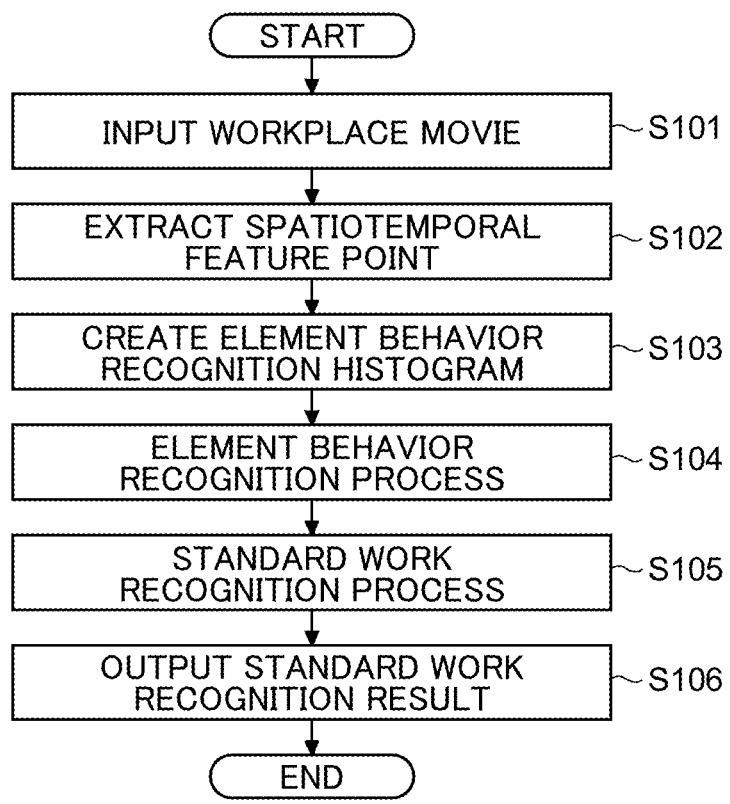
FIG. 9 is a flowchart illustrating an example of a behavior recognition process according to the embodiment of the present invention.

Here, the action of the behavior recognition processor 12 according to the present embodiment will be described in detail with reference to the block diagram illustrated in FIG. 8 and FIGS. 9 to 16. FIG. 9 is a flowchart illustrating an example of the behavior recognition process executed on a movie acquired by the camera 20.

Figure 10:
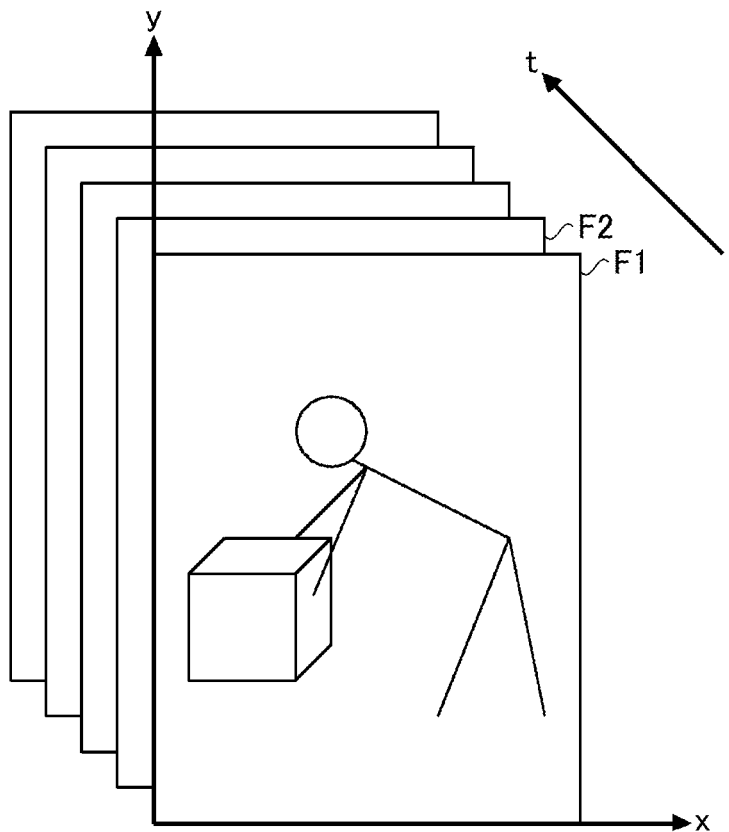
FIG. 10 is a diagram illustrating an example of time-series image frames input to a workplace photographing/movie input unit in the embodiment of the present invention.
Figure 11:
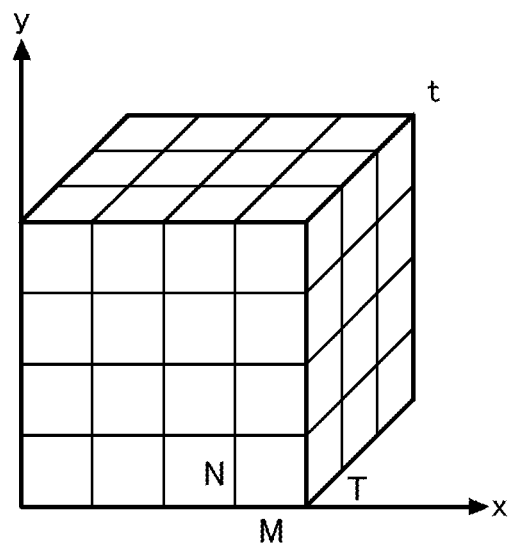
FIG. 11 is a diagram for explaining a feature point detection method according to the embodiment of the present invention.

As illustrated in FIGS. 8 and 9, firstly in the present action, the workplace photographing/movie input unit 101 receives an input of a movie from the camera 20 that has captured images via the interface 11 (step S101). FIG. 10 illustrates an example of time-series image frames input to the workplace photographing/movie input unit 101. In FIG. 10, the horizontal axis x and the vertical axis y of the input image frames denote spatial coordinates. F1, F2, . . . denote time-series image frames along a time axis time. That is, the input image frame is image data represented by spacetime (x, y, t) (hereinafter referred to as spatiotemporal image data), as illustrated in FIG. 11. One pixel I(x, y, t) in the spacetime refers to a function of spatial coordinates (x, y) and time t.

Next, in order to recognize a workplace standard work, an action to recognize an element behavior is executed. Specifically, the spatiotemporal feature point extraction unit 102 executes a process of selecting every N image frames from the movie that has been input and extracting a feature point in the spacetime (also referred to as spatiotemporal feature point) from each selection of the N image frames (step S102). First, in step S102, element behaviors as exemplified in FIG. 3 and FIGS. 4 to 6 are defined. For example, the standard work of putting a product on the product shelf is decomposed into three element behaviors and defined as stated in the standard work document in FIG. 3. The defined three element behaviors are the element behavior (s1) of the standard work of temporarily placing the box 43 containing the target product 44, the element behavior (s2) of the standard work of searching the box 43 containing the target product 44 for the target product 44 and taking out the target product 44 from the box 43 while the worker 42 bends his/her waist, and the element behavior (s3) of the standard work of putting the taken-out target product 44 on the product shelf. The number of element behaviors is previously determined such that the standard work is decomposed so as to be easy to recognize. In the above example, the standard work is decomposed into three element behaviors, but another standard work may be divided into a different number of element behaviors. Behavior recognition is performed on each element behavior. It is thus expected to prepare the different number of element behavior recognition dictionaries.

Subsequently, in step S102, the spatiotemporal feature point extraction unit 102 recognizes the defined element behavior. When a worker moves in the workplace, a change point is produced in the spatiotemporal image data illustrated in FIG. 11. The spatiotemporal feature point extraction unit 102 identifies the change point in the spatiotemporal image data, that is, the feature point in the spacetime to recognize the element behavior.

Here, a feature point detection method according to the present embodiment will be described. In the present action, the spatiotemporal image data, which is image data in the spacetime made up of the N image frames, is divided into blocks, as illustrated in FIG. 11. The large cube in FIG. 11 indicates the whole spatiotemporal image data. In FIG. 11, the horizontal axis denotes the spatial coordinate x and the vertical axis denotes the spatial coordinate y. The unit of each axis is a pixel and t denotes a time axis. For example, the time-series image data includes image data input at a rate of 30 frames/second. The direction of the time axis time represents a time series axis of the image frames. By converting the value of the time axis time with the image frame, the actual time can be obtained.

In the example illustrated in FIG. 11, the spatiotemporal image data is divided into blocks having a size (M, N, T). The size of one block is expressed by a horizontal M pixel, a vertical N pixel, and T frame. In this disclosure, M, N, and T are previously determined. One square in FIG. 11 indicates one block. When a behavior of a worker with movement is produced, the feature amount of a corresponding block becomes large in the spatiotemporal image data with movement. That is, a large amount of change is produced in the spacetime.

Subsequently, a method of extracting a block having a large amount of change as a feature point in step S102 will be described. In extracting a feature point from the spatiotemporal image data, the spatiotemporal feature point extraction unit 102 first performs a smoothing process for removing noise in a spatial direction, namely, in an (x, y) direction. In this smoothing process, following expression (1) is used.

[Mathematical Expression 1]

$$L(x,y,t)=I(x,y,t)*g(x,y) \quad (1)$$

In expression (1), I(x, y, t) denotes the pixel value of a pixel at (x, y) coordinates in a frame at time t. In addition, g(x, y) denotes a kernel for the smoothing process. The asterisk (*) denotes a convolution process. The smoothing process may be simply a pixel averaging process or may be an existing Gaussian smoothing filtering process.

Next, in step S102, the spatiotemporal feature point extraction unit 102 performs a filtering process on the time axis. In this filtering process, a Gabor filtering process using following expression (2) is executed. Here, $g_{ev}$ and $g_{od}$ denote kernels of a Gabor filter indicated by expressions (3) and (4) to be described later. The asterisk (*) denotes a convolution process. Letters τ and ω denote parameters of the kernels of the Gabor filter.

[Mathematical Expression 2]

$$R(x,y,t)=(L(x,y,t)*g_{ev})^2+(L(x,y,t)*g_{od})^2 \quad (2)$$

[Mathematical Expression 3]

$$g_{ev}(t;\tau,\omega)=-\cos(2\pi t\omega)e^{-t^2/\tau^2} \quad (3)$$

[Mathematical Expression 4]

$$g_{od}(t;\tau,\omega)=-\sin(2\pi t\omega)e^{-t^2/\tau^2} \quad (4)$$

Once the filtering process as described above is executed on all the pixels of the spatiotemporal image data illustrated in FIG. 10, the spatiotemporal feature point extraction unit 102 obtains the average value of R(x, y, t) in the divided block illustrated in FIG. 11 in step S102. In this average value computation process, for example, following expression (5) is used to work out the average value of a block located at the spacetime coordinates (x, y, t).

[Mathematical Expression 5]

$$M(x, y, t) = \frac{\sum_{i=1}^{M}\sum_{j=1}^{N}\sum_{k=1}^{T} R(x+i, y+j, t+k)}{M \times N \times T} \quad (5)$$

Then, as illustrated in following expression (6), when the average value M(x, y, t) in the block is greater than a threshold value Thre_M, the spatiotemporal feature point extraction unit 102 assigns this block as a feature point.

[Mathematical Expression 6]

$$M(x,y,t) \% \text{Thre\_}M \quad (6)$$

Figure 12:
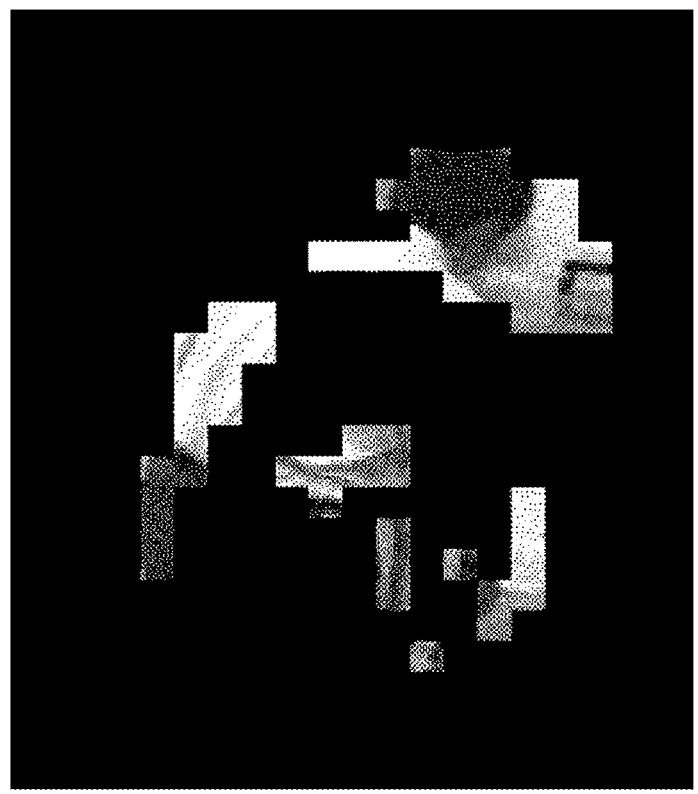
FIG. 12 is a diagram illustrating an example of feature points extracted from spatiotemporal data illustrated in FIG. 2.
Figure 13:
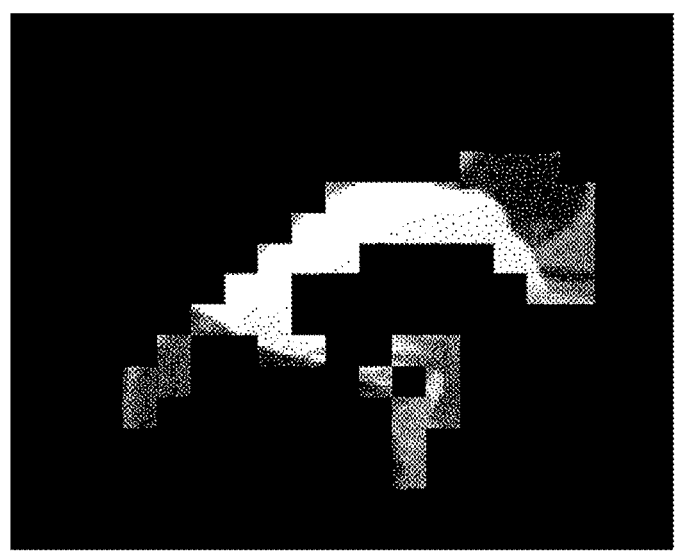
FIG. 13 is a diagram illustrating an example of feature points at the time after a predetermined time has elapsed from the element behavior illustrated in FIG. 2.

FIG. 12 is a diagram illustrating an example of feature points at time t extracted from the spatiotemporal data indicating the element behavior (s1) of the standard work of putting a product on the product shelf at the workplace in FIG. 2. As illustrated in FIG. 12, feature points are extracted in portions with movement. FIG. 13 is a diagram illustrating an example of feature points at time t+Δt after a predetermined time Δt has elapsed from the element behavior (s1) illustrated in FIG. 2.

Subsequently, a method of describing feature points extracted from the spatiotemporal image data as described above will be explained. When a feature point block is extracted from the spatiotemporal image data illustrated in FIG. 11, the spatiotemporal feature point extraction unit 102 obtains spatiotemporal edge information E(x, y, t) of a pixel in this feature point block. In the computation of the spatiotemporal edge information, the differentiation operation indicated by following expression (7) is executed to work out edge information of the pixel I(x, y, t).

[Mathematical Expression 7]

$$E(x, y, t) = \left(\frac{\partial I}{\partial x}, \frac{\partial I}{\partial y}, \frac{\partial I}{\partial t}\right) \quad (7)$$

As a result, in the spatiotemporal image data illustrated in FIG. 11, since there are M×N×T pixels in one block, M×N×T×3 number of differential values are obtained. Therefore, the spatiotemporal feature point extraction unit 102 describes this block as a vector of M×N×T×3 differential values. That is, the feature points are described as an M×N×T×3-dimensional differential vector.

Next, prior to the execution of an element behavior recognition process, the element behavior recognition unit 103 creates an element behavior recognition histogram (step S103). In creating the element behavior recognition histogram, the element behavior recognition dictionary input unit 105 first acquires an element behavior recognition dictionary and inputs the acquired element behavior recognition dictionary to the element behavior recognition unit 103. The action of creating the element behavior recognition dictionary will be described later with reference to FIG. 20. Subsequently, the element behavior recognition unit 103 calculates a distance between the M×N×T×3-dimensional differential vector of each feature point block and K mean vectors Vk in the element behavior recognition dictionary, and categorizes the type of each feature point block into the same type as the type of a block of the nearest learning mean vector. As a result, the feature point block is classified into K types of blocks. Then, in step S103, the element behavior recognition unit 103 obtains a feature point histogram T(k) of a test movie with the appearance frequency of each type.

Next, in step S103, the element behavior recognition unit 103 obtains a similarity S(T, H) between the feature point histogram T(k) of the test movie and a learning histogram H(k) of learning data using following expression (8).

[Mathematical Expression 8]

$$S(T, H) = \sum_{u=1}^{K} \sqrt{T(u)H(u)} \quad (8)$$

Then, as indicated by following expression (9), the element behavior recognition unit 103 executes the element behavior recognition process to recognize that the test movie has the same element behavior as the learning data when the similarity S(T, H) between the feature point histogram T(k) of the test movie and the learning histogram H(k) of the learning data is greater than a certain threshold value Thre_S (step S104).

[Mathematical Expression 9]

$$S(T,H) > \text{Thre\_}S \quad (9)$$

Next, the standard work recognition processing unit 104 executes a standard work recognition process (step S105). In the standard work recognition process, the standard work recognition processing unit 104 recognizes a workplace behavior associated with the element behavior recognized in step S104. For example, in the case of the standard work as exemplified in FIG. 2, the standard work recognition result is obtained by an action to be exemplified later with reference to FIG. 15. Then, the standard work recognition result obtained in this manner is output from the standard work recognition result output unit 106 (step S106) and the present action is terminated.

Figure 15:
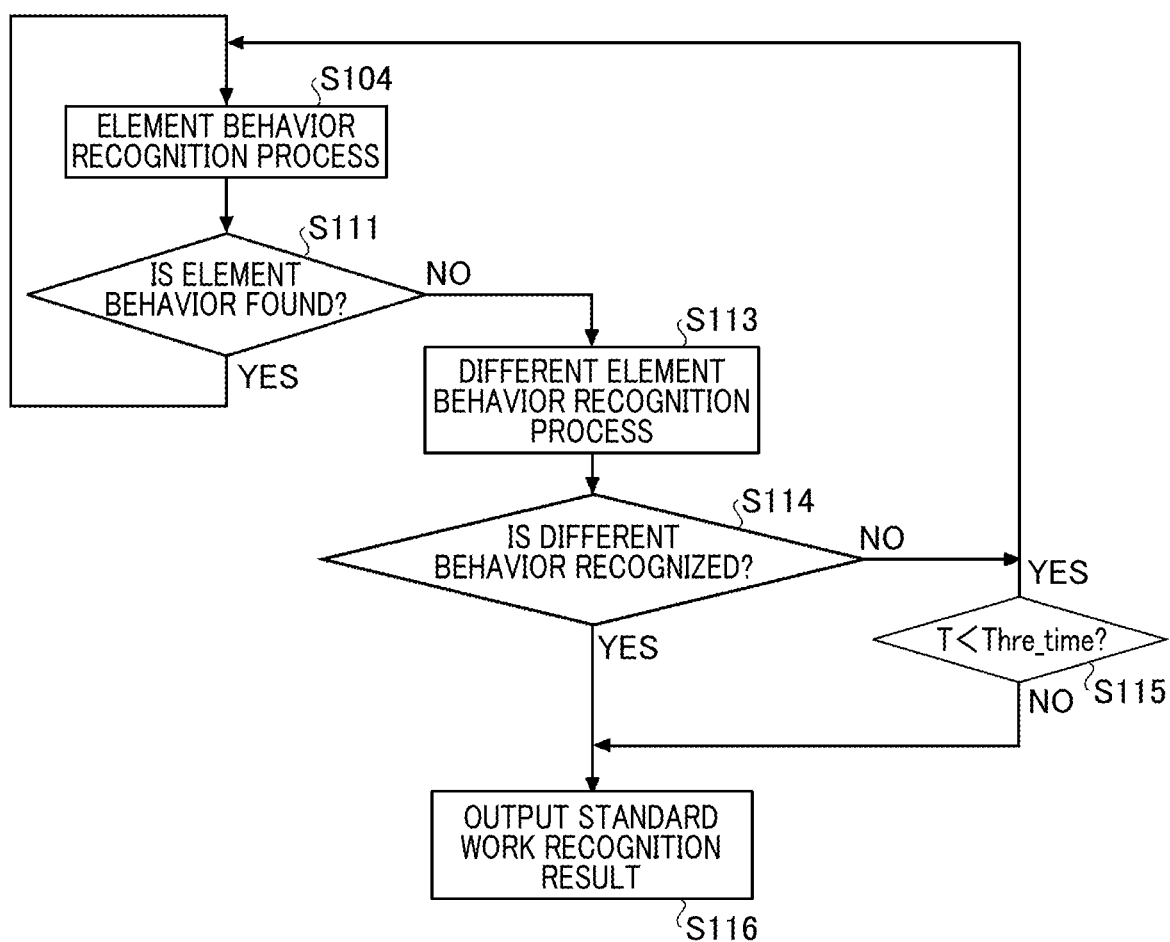
FIG. 15 is a diagram for explaining an action when an error occurs in an element behavior recognition process according to the embodiment of the present invention.

Next, an action when an error occurs in the element behavior recognition process indicated in step S104 in FIG. 9, namely, an action when no element behavior is recognized will be described. FIG. 15 is a diagram for explaining an action when an error occurs in the element behavior recognition process indicated in step S104 in FIG. 9.

Figure 14:
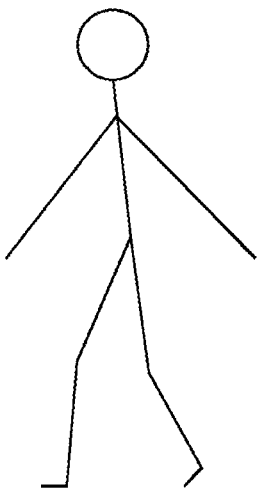
FIG. 14 is a diagram for explaining a recognition process for a walking behavior according to the embodiment of the present invention.

As illustrated in FIG. 15, in the present action, the element behavior recognition process is executed first (step S104) as in step S104 in FIG. 9. Then, using the result of the element behavior recognition process, element behavior finding is executed (S111) to find the element behavior of the standard work. When the element behavior of the standard work is not detected (NO in S111), in other words, when an error occurs in the element behavior recognition process, a different element behavior recognition process is executed to recognize a behavior different from the standard work (S113). In the different element behavior recognition process, for example, the recognition process for a walking behavior illustrated in FIG. 14 is executed. Then, for example, when a walking process behavior is detected (YES in step S114), the element behavior recognition for the standard work is terminated and the recognition result for the standard work is output (S116).

In addition, when another element behavior of the standard work besides the walking behavior is regarded as a recognition target, the recognition process for the another element behavior is also performed (S114). Likewise, when another behavior is recognized (YES in S114), the element behavior recognition for the standard work is terminated and the recognition result for the standard work is output (S116).

On the other hand, when another element behavior is not recognized (NO in S114), an interval T of the element behaviors recognized in the element behavior recognition process (S104) is compared with a time threshold value Thre_time determined in advance (S115), and the element behavior recognition process (S104) or standard work recognition result output (S116) is executed on the basis of the result of the comparison.

Figure 16:
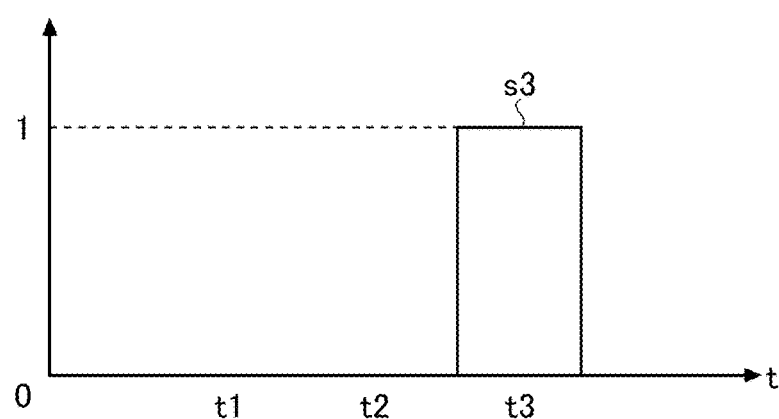
FIG. 16 is a diagram for explaining the start time and the required time for an entire behavior in a case where one element behavior among three element behaviors is recognized alone in the embodiment of the present invention.

Here, the action in step S115 will be described with reference to an example of the required time for the recognized standard work and element behaviors of the standard work illustrated in FIGS. 16 to 19. For example, as illustrated in FIG. 16, when one of the element behaviors s1 to s3, namely, the element behavior s3 is recognized alone, the start time of the entire behavior is assigned to the start time of the element behavior s3 and the required time for the entire behavior is assigned to the required time t3 for the element behavior s3.

Figure 17:
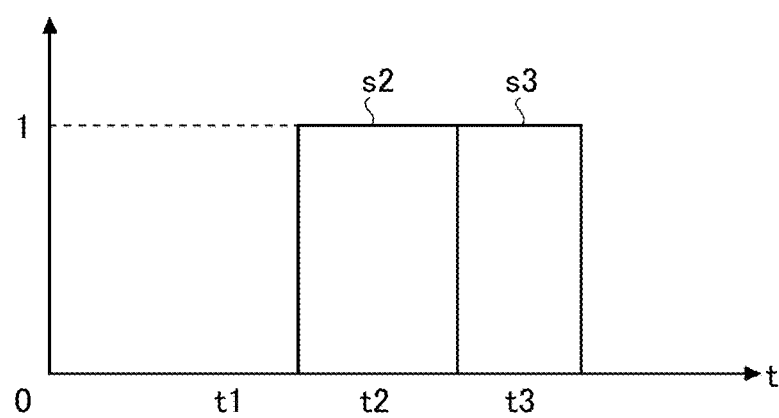
FIG. 17 is a diagram for explaining the start time and the required time for an entire behavior in a case where two consecutive element behaviors among three element behaviors are recognized in the embodiment of the present invention.

On the other hand, as illustrated in FIG. 17, when two consecutive element behaviors s2 and s3 are recognized, the start time of the earliest element behavior s2 is regarded as the start time of the entire behavior and the end time of the latest element behavior s3 is regarded as the end time of the entire behavior, such that the required time for the entire behavior is assigned as required time t2+t3 obtained by summing the element behaviors s2 and s3.

Figure 18:
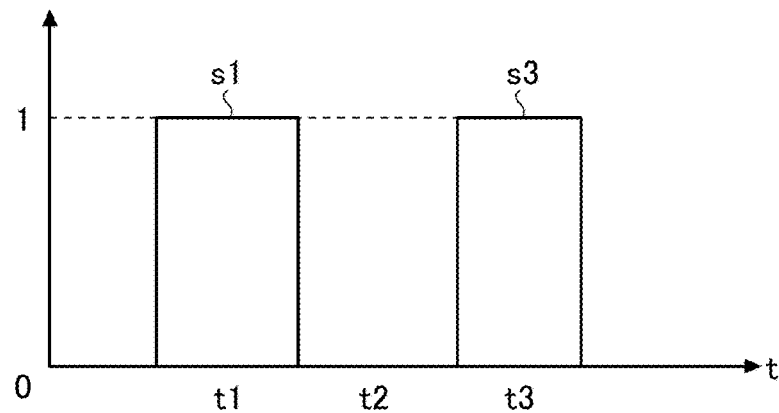
FIG. 18 is a diagram for explaining the start time and the required time for an entire behavior in a case where two non-consecutive element behaviors among three element behaviors are recognized in the embodiment of the present invention.

In addition, as illustrated in FIG. 18, in a case where two non-consecutive element behaviors s1 and s3 are recognized and the interval T between the top element behavior s1 and the last element behavior s3 is shorter than the time threshold value Thre_time set in advance (YES in S115), the element behaviors s1 and s3 are regarded as a single behavior, such that the start time of the entire behavior is assigned to the start time of the element behavior s1 and the end time of the entire behavior is assigned to the end time of the element behavior s3. Then, the required time for the entire behavior is calculated from the start time of the element behavior s1 and the end time of the element behavior s3.

However, in a case where two non-consecutive element behaviors s1 and s3 are recognized and the interval T between the top element behavior s1 and the last element behavior s3 is equal to or longer than the time threshold value Thre_time (NO in S115), the element behaviors s1 and s3 are regarded as the same type of behavior, but the behaviors themselves are regarded as different behaviors, such that the start time and the required time for each behavior are separately counted.

Figure 19:
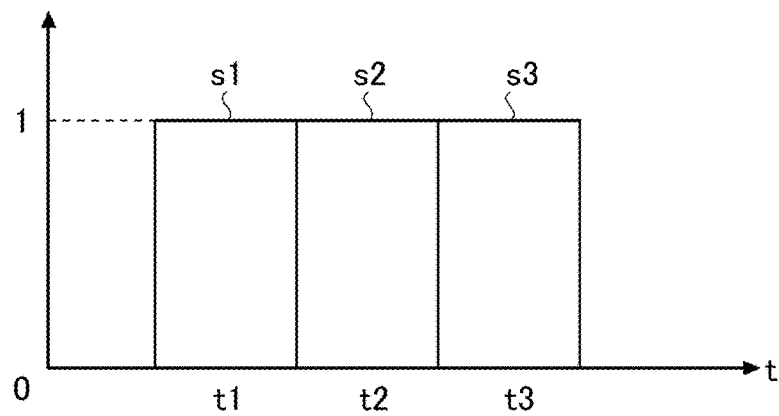
FIG. 19 is a diagram for explaining the start time and the required time for an entire behavior in a case where all element behaviors are recognized in the embodiment of the present invention.

Meanwhile, as illustrated in FIG. 19, when all of the three element behaviors s1, s2 and s3 are recognized, the start time of the element behavior s1 is assigned as the start time of the waist bending behavior and the required time for the entire behavior is assigned as required time t1+t2+t3 obtained by summing the three element behaviors s1 to s3.

Then, as indicated in S116 in FIG. 15, the start time of the entire behavior and the required time for the entire behavior specified as described above are output as a standard work recognition result.

Figure 20:
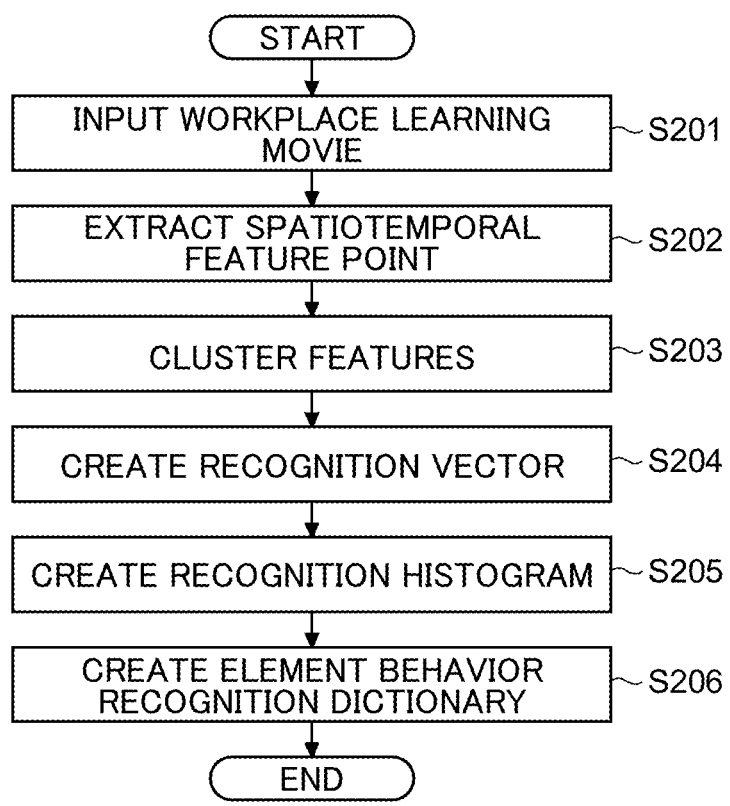
FIG. 20 is a flowchart illustrating an example of an action of creating an element behavior recognition dictionary according to the embodiment of the present invention.

Next, the action of creating the element behavior recognition dictionary will be described in detail with reference to FIG. 20. FIG. 20 is a flowchart illustrating an example of the action of creating the element behavior recognition dictionary using a movie sample of the element behavior as learning data.

As illustrated in FIG. 20, in the action of creating the element behavior recognition dictionary, the element behavior recognition dictionary input unit 105 collects movie samples of the element behavior and inputs the collected movie samples to itself as movie data for workplace learning (hereinafter referred to as workplace learning movie) (step S201).

Next, the element behavior recognition dictionary input unit 105 gathers N image frames including the element behavior out of the input workplace learning movie into one piece of learning data and extracts the spatiotemporal feature point from the one piece of learning data (step S202). The method of extracting the spatiotemporal feature point may be the same as the method described above using step S102 in FIG. 9. In step S202, a plurality of pieces of the learning data is generated from the input workplace learning movie and the spatiotemporal feature points are extracted from each of the plurality of pieces of the generated learning data. Then, each extracted spatiotemporal feature point is differentially processed with expression (7), such that the M×N×T×3-dimensional differential vector is obtained.

Next, the element behavior recognition dictionary input unit 105 classifies (clusters) the spatiotemporal feature points extracted from all pieces of the learning data in step S202 (step S203). The element behavior recognition dictionary input unit 105 classifies the learned spatiotemporal feature points using, for example, the K-means clustering method. That is, the M×N×T×3-dimensional differential vectors are classified by the K-means clustering method. The number of classes that has been classified is assumed as K. With this classification, the feature points extracted from the learning data are classified into K types of feature points. In the K-means clustering method, feature points of the same type have similar features.

Next, the element behavior recognition dictionary input unit 105 averages M×N×T×3-dimensional edge vectors of the feature points of the same type for K types of spatiotemporal feature points to work out K mean vectors Vk (step S204). Each mean vector Vk is a vector serving as a representative of the feature points of the corresponding type.

Next, the element behavior recognition dictionary input unit 105 calculates a total number of blocks of each group for K types of spatiotemporal feature points to work out the learning histogram H(k) (step S205). H(k) denotes the frequency of a feature point k group.

Then, the element behavior recognition dictionary input unit 105 creates an element behavior recognition dictionary in which the mean vectors Vk and the learning histogram H(k) obtained from the learning data are accumulated as element behavior recognition dictionary data (step S206). The element behavior recognition dictionary thus created is input to the element behavior recognition unit 103 (see FIG. 8).

Figure 21:
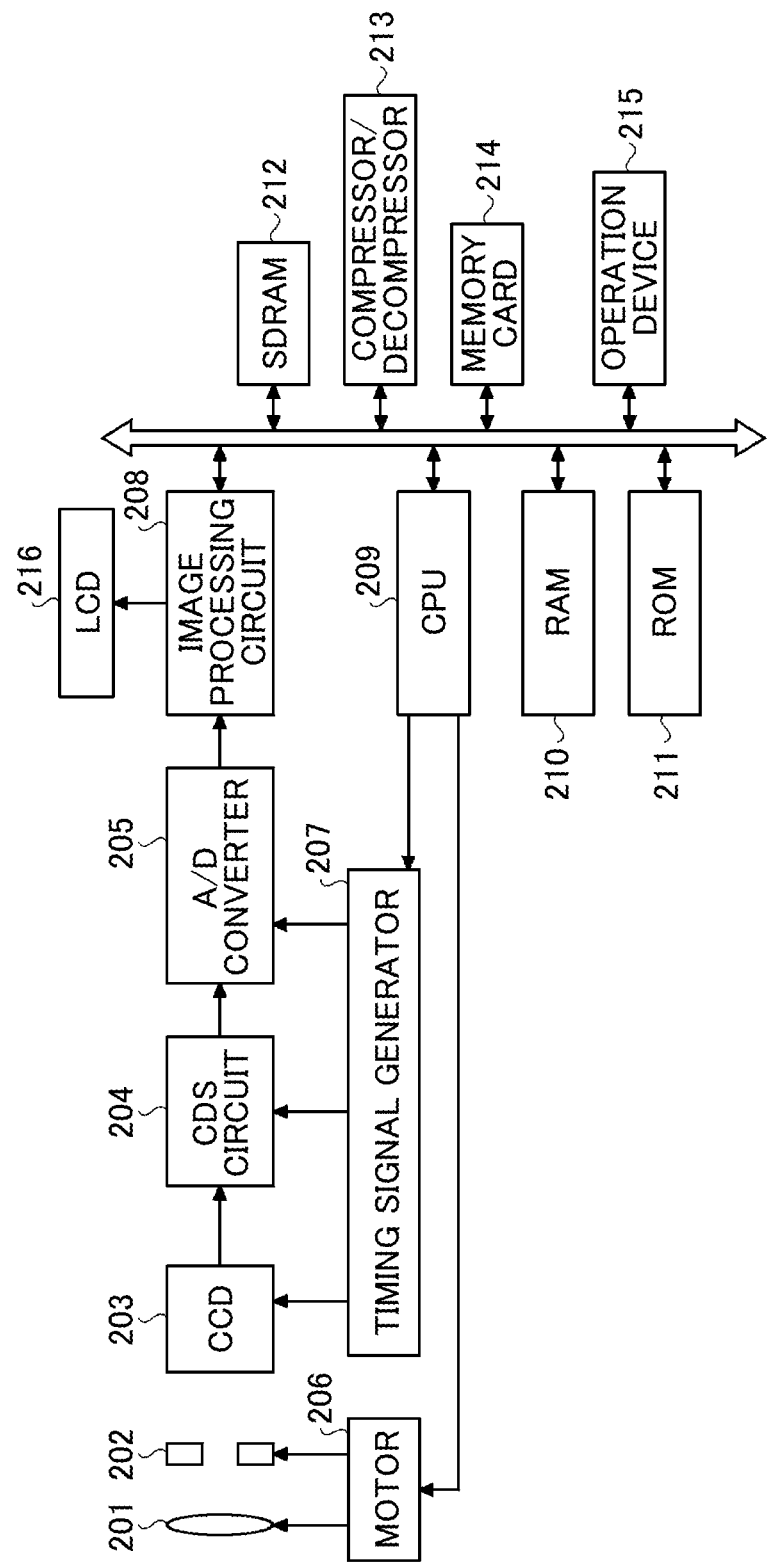
FIG. 21 is a block diagram illustrating a hardware configuration example of a camera according to the embodiment of the present invention.

Next, the camera 20 (see FIG. 1) according to the present embodiment will be described. FIG. 21 is a block diagram illustrating a hardware configuration example of the camera according to the embodiment. As illustrated in FIG. 21, subject light enters a charge coupled device (CCD) 203 through a photographing optical system 201. A mechanical shutter 202 that transmit and block incident light is disposed between the photographing optical system 201 and the CCD 203. The photographing optical system 201 and the mechanical shutter 202 are driven by a motor driver (motor) 206.

The CCD 203 converts an optical image formed on an imaging surface into an electrical signal and outputs the converted electrical signal as analog image data. A noise component is removed from image information output from the CCD 203 by a correlated double sampling (CDS) circuit 204; the image information after removal of noise component is converted into a digital value by an analog-to-digital (A/D) converter 205 and then output to an image processing circuit 208.

The image processing circuit 208 performs various types of image processes such as YCrCb conversion process, white balance control process, contrast correction process, edge enhancement process, and color conversion process, using a synchronous dynamic random access memory (SDRAM) 212 that provisionally retains the image data. The white balance process is an image process for adjusting the color density of the image information and the contrast correction process is an image process for adjusting the contrast of the image information. The edge enhancement process is an image process for adjusts the sharpness of the image information and the color conversion process is an image process for adjusting the color tone of the image information. In addition, the image processing circuit 208 displays image information on which the signal process and the image process have been carried out, on a liquid crystal display 216 (hereinafter abbreviated as LCD 216).

Furthermore, the image information on which the signal process and the image process have been carried out is recorded in a memory card 214 via a compressor/decompressor 213. The above-mentioned compressor/decompressor 213 is a circuit that compresses the image information output from the image processing circuit 208 to output to the memory card 214, and also decompresses the image information read out from the memory card 214 to output to the image processing circuit 208, according to an instruction acquired from an operation device 215.

A central processing unit (CPU) 209 controls the timing for the CCD 203, the CDS circuit 204, and the A/D converter 205 via a timing signal generator 207 that generates a timing signal. Furthermore, the CPU 209 also controls the image processing circuit 208, the compressor/decompressor 213, and the memory card 214.

In an image pickup apparatus, the CPU 209 performs various types of arithmetic operation processes in accordance with a program and is built with a read only memory (ROM) 211, which is a read-only memory that retains a program and the like, a work area used in course of various types of processes, and a random access memory (RAM) 210, which is a freely readable and writable memory having a retention area for various types of data and the like. These built-in constituents are interconnected by a bus line.

Then, the output of the camera 20 described above is input to the behavior recognition processor 12 via the interface 11 of the recognition processing device 10 illustrated in FIG. 1.

As described thus far, in the present embodiment, the standard work of the worker having a certain procedure is recognized from the movie obtained by photographing the workplace. The standard work is decomposed into a plurality of element behaviors and the standard work is recognized by the element behavior recognition. The time for the element behavior of the recognized standard work is measured and the work time for the entire standard work is calculated. A plurality of image frames is input and the spatiotemporal feature point is extract from these images. The feature amount of the element behavior of the standard work is obtained from the extracted feature point and the element behavior of the standard work is recognized. The standard work performed by the worker at the workplace is recognized according to the recognized element behavior. With such a configuration, it becomes practicable to recognize the standard work performed by the worker at the workplace and to measure the work time for the standard work. As a result, it becomes feasible to implement a behavior recognition apparatus, a behavior recognition method, computer readable program for the behavior recognition apparatus and the behavior recognition method, and a recording medium recording the program, which are capable of coping with diverse posture changes of the workers at the work site and automatically measuring the required time for the standard work.

The workplace standard work recognition program executed by the recognition apparatus of the present embodiment has a module configuration including the workplace standard work recognition function described above and, in actual hardware of the recognition processing device 10 in FIG. 1, when the CPU (processor) reads out the image processing program from the above-mentioned storage medium to execute, the above-described respective units are loaded on a main storage device and the standard work recognition result is output. The element behavior recognition dictionary is input and the similarity in evaluation formula (8) between the feature point histogram $T(k)$ obtained from the recognition movie and the learning histogram $H(k)$ is obtained, such that the element behavior recognition process is performed. The start time and the required time for the workplace behavior are obtained according to the recognition result for the element behavior and the result of the behavior recognition is output.

The behavior recognition apparatus according to the present embodiment includes a control device such as a CPU, a storage device such as a read only memory (ROM) and a RAM, an external storage device such as a hard disk drive (HDD) or a compact disc (CD) drive device, a display device such as a display monitor device, and an input device such as a keyboard and a mouse, which form a hardware configuration using an ordinary computer.

Furthermore, the program executed by the behavior recognition apparatus according to the present embodiment is provided as a file in an installable format or executable format recorded in a computer readable recording medium, such as a CD-ROM, a flexible disk (FD), a CD-R, or a digital versatile disk (DVD).

The program executed by the behavior recognition apparatus of the present embodiment may be configured so as to be retained on a computer connected to a network such as the Internet and provided by being downloaded by way of the network. The program executed by the behavior recognition apparatus of the present embodiment may be configured so as to be provided or distributed by way of a network such as the Internet.

The program executed by the behavior recognition apparatus according to the present embodiment may be configured so as to be provided by being incorporated in advance in a ROM or the like.

The program executed by the behavior recognition apparatus according to the present embodiment has a module configuration including the above-described respective units (the workplace photographing/movie input unit 101, the spatiotemporal feature point extraction unit 102, the element behavior recognition unit 103, the standard work recognition processing unit 104, the element behavior recognition dictionary input unit 105, and the standard work recognition result output unit 106). In actual hardware, when a CPU (processor) reads out the program from the above-mentioned storage medium to execute, the above-described respective units are loaded on the main storage device, such that the workplace photographing/movie input unit 101, the spatiotemporal feature point extraction unit 102, the element behavior recognition unit 103, the standard work recognition processing unit 104, the element behavior recognition dictionary input unit 105, and the standard work recognition result output unit 106 are generated on the main storage device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A behavior recognition apparatus, comprising:
 processing circuitry configured to:
  receive an input of a movie obtained by capturing images of a site;
  recognize a plurality of element behaviors constituting a standard work of a worker included in the movie; and
  determine a start time and a required time for the standard work from the plurality element behaviors, wherein
 in a case that two or more non-consecutive element behaviors, which are a part of the plurality of element behaviors for the standard work, are recognized and a time interval between a top element behavior and a last element behavior is shorter than a threshold value, the processing circuitry is further configured to:
  regard the two or more non-consecutive element behaviors as a single behavior,
  assign a start time of the top element behavior to the start time of the standard work, and
  assign a required time obtained by summing the two or more non-consecutive element behaviors as the required time for the standard work.

2. The behavior recognition apparatus according to claim 1, wherein the processing circuitry is further configured to:
 extract one or more feature points in image frames of the movie;
 classify the extracted one or more feature points;
 obtain a similarity between a first histogram of the classified one or more feature points and a second histogram previously learned; and
 in a case that the similarity is equal to or greater than a threshold value, recognizes a behavior of the worker containing the one or more feature points as an element behavior.

3. The behavior recognition apparatus according to claim 2, wherein the processing circuitry is further configured to:
 divide the movie into a plurality of blocks, each block of the plurality of blocks having a size by horizontal M pixels, vertical N pixels, and T frames, each of M, N, and T being a preset number;
 differentially process each block of the plurality of blocks to calculate a differential vector of M×N×T×3 dimensions;
 generate a comparison by comparing the differential vector with edge vectors that have been previously learned to be classified into a plurality of types;
 classify the differential vector based on a result of the comparison; and
 create the first histogram based on a result of classifying the differential vector.

4. The behavior recognition apparatus according to claim 3, wherein the processing circuitry is further configured to:
 apply a filtering process to a time axis on the image frames of the movie; and
 extract the one or more feature points based on a result of the filtering process.

5. The behavior recognition apparatus according to claim 4, wherein
 $g_{ev}$ and $g_{od}$ denote kernels in a Gabor filter indicated by following expressions (1) and (2),
 * denotes a convolution process,
 $\tau$ and $\omega$ denote parameters of the kernels, and the filtering process is a Gabor filtering process using following expression (3):

[Mathematical Expression 1]

$$g_{ev}(t;\tau,\omega) = -\cos(2\pi t\omega)e^{-t^2/\tau^2} \quad (1)$$

[Mathematical Expression 2]

$$g_{od}(t;\tau,\omega) = -\sin(2\pi t\omega)e^{-t^2/\tau^2} \quad (2)$$

[Mathematical Expression 3]

$$R(x,y,t) = (L(x,y,t)*g_{ev})^2 + (L(x,y,t)*g_{od})^2 \quad (3).$$

6. The behavior recognition apparatus according to claim 4, wherein the processing circuitry is further configured to execute a smoothing process on each image frame of the movie prior to the filtering process.

7. The behavior recognition apparatus according to claim 1, wherein the circuitry is further configured to:
 detect the plurality of element behaviors of the standard work from the movie;
 in a case that the plurality of element behaviors are not detected from the movie, detect a behavior other than the plurality of element behaviors of the standard work; and
 output the start time and the required time for the standard work each determined based on the plurality of element behaviors.

8. The behavior recognition apparatus according to claim 1, wherein in a case that all of the plurality of element behaviors for the standard work are recognized, the processing circuitry:
 assigns a start time of an earliest element behavior to the start time of the standard work, and
 assigns a required time, obtained by summing all the recognized element behaviors, as the required time for the standard work.

9. The behavior recognition apparatus according to claim 1, wherein in a case that two or more consecutive element behaviors, which are a part of the plurality of element behaviors for the standard work, are recognized, the processing circuitry:
 assigns a start time of an earliest element behavior to the start time of the standard work, and
 assigns a required time, obtained by summing the two or more consecutive element behaviors, as the required time for the standard work.

10. The behavior recognition apparatus according to claim 1, wherein in a case that the two or more non-consecutive element behaviors are recognized and a time interval between the top element behavior and a last element behavior is equal to or greater than the threshold value, the processing circuitry assigns the two or more non-consecutive element behaviors as behaviors different from each other.

11. A behavior recognition method for recognizing a behavior of a worker, the behavior recognition method comprising:
  receiving an input of a movie obtained by capturing images of a site;
  recognizing a plurality of element behaviors constituting a standard work of a worker included in the movie;
  determining a start time and a required time for the standard work from the plurality of one or more element behaviors; and
  in a case that two or more non-consecutive element behaviors, which are a part of the plurality of element behaviors for the standard work, are recognized and a time interval between a top element behavior and a last element behavior is shorter than a threshold value:
    regarding the two or more non-consecutive element behaviors as a single behavior;
    assigning a start time of the top element behavior to the start time of the standard work; and
    assigning a required time obtained by summing the two or more non-consecutive element behaviors as the required time for the standard work.

12. A non-transitory recording medium storing a plurality of instructions which, when executed by one or more processors, cause the processors to perform a behavior recognition method for recognizing a behavior of a worker, the behavior recognition method comprising:
  receiving an input of a movie obtained by capturing images of a site;
  recognizing a plurality of element behaviors constituting a standard work of a worker included in the movie;
  determining a start time and a required time for the standard work from the plurality of one or more element behaviors; and
  in a case that two or more non-consecutive element behaviors, which are a part of the plurality of element behaviors for the standard work, are recognized and a time interval between a top element behavior and a last element behavior is shorter than a threshold value:
    regarding the two or more non-consecutive element behaviors as a single behavior;
    assigning a start time of the top element behavior to the start time of the standard work; and
    assigning a required time obtained by summing the two or more non-consecutive element behaviors as the required time for the standard work.

* * * * *